(12) United States Patent
Van Luchene

(10) Patent No.: US 6,223,163 B1
(45) Date of Patent: Apr. 24, 2001

(54) METHOD AND APPARATUS FOR CONTROLLING OFFERS THAT ARE PROVIDED AT A POINT-OF-SALE TERMINAL

(75) Inventor: Andrew S. Van Luchene, Norwalk, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/045,084

(22) Filed: Mar. 20, 1998

Related U.S. Application Data

(63) Continuation-in-part of application No. 08/920,116, filed on Aug. 26, 1997, which is a continuation-in-part of application No. 08/822,709, filed on Mar. 21, 1997.

(51) Int. Cl.[7] ...................................................... G06F 17/60
(52) U.S. Cl. .................................. 705/1; 705/14; 705/16; 705/10; 705/23; 705/26; 902/22
(58) Field of Search .................................. 705/16, 26, 14, 705/10, 23, 1, 44; 340/825.35; 902/22

(56) References Cited

U.S. PATENT DOCUMENTS

| | | |
|---|---|---|
| Re. 34,915 | 4/1995 | Nichtberger et al. . |
| 3,573,747 | 4/1971 | Adams et al. . |
| 4,108,361 | 8/1978 | Krause . |
| 4,323,770 | 4/1982 | Dieulot et al. . |
| 4,494,197 | 1/1985 | Troy et al. . |
| 4,500,880 | 2/1985 | Gomersall et al. . |
| 4,669,730 | 6/1987 | Small . |
| 4,677,553 | 6/1987 | Roberts et al. . |
| 4,689,742 | 8/1987 | Troy et al. . |
| 4,723,212 | 2/1988 | Mindrum et al. . |
| 4,760,247 | 7/1988 | Keane et al. . |
| 4,815,741 | 3/1989 | Small . |
| 4,825,045 | 4/1989 | Humble . |
| 4,839,507 | 6/1989 | May . |
| 4,854,590 | 8/1989 | Jolliff et al. . |
| 4,859,838 | 8/1989 | Okiharu . |
| 4,882,473 | 11/1989 | Bergeron et al. . |
| 4,908,761 | 3/1990 | Tai . |
| 4,910,672 | 3/1990 | Off et al. . |

(List continued on next page.)

FOREIGN PATENT DOCUMENTS

| | | |
|---|---|---|
| 512413 | 11/1992 | (EP) . |
| 780788 | * 6/1997 | (EP) . |
| 5242363 | 9/1993 | (JP) . |

(List continued on next page.)

OTHER PUBLICATIONS

Kennedy Doug, Train front desk staff in sales, pp. 1–2, Mar. 1997.*

Debby Garbato, Cook's Warehouse offers, pp. 1–2, Aug. 1994.*

Rodwin Marc A, Consumer protection and managed care, pp. 1–7, Sep. 1996.*

(List continued on next page.)

*Primary Examiner*—James P. Trammell
*Assistant Examiner*—Mussie Tesfamariam
(74) *Attorney, Agent, or Firm*—Dean P. Alderucci

(57) ABSTRACT

A POS terminal or other computing device provides a plurality of offers to customers, and then measures a performance rate of each offer. For example, the acceptance rate or the profit rate of the offers may be measured. Based on the performance rates, a subset of offers is selected. In one embodiment, the highest performing offers are selected. In another embodiment, those offers having performance rates above a predetermined threshold are selected. The selected subset of offers is then provided, while the remaining, less desirable offers are discontinued.

18 Claims, 11 Drawing Sheets

U.S. PATENT DOCUMENTS

| | | |
|---|---|---|
| 4,922,522 | 5/1990 | Scanlon . |
| 4,937,853 | 6/1990 | Brule et al. . |
| 4,973,952 | 11/1990 | Malec et al. . |
| 4,982,337 | 1/1991 | Burr et al. . |
| 4,993,714 | 2/1991 | Golightly . |
| 5,056,019 | 10/1991 | Schultz et al. . |
| 5,119,295 | 6/1992 | Kapur . |
| 5,128,862 | 7/1992 | Mueller . |
| 5,132,914 | 7/1992 | Cahlander et al. . |
| 5,172,328 | 12/1992 | Cahlander et al. . |
| 5,173,851 | 12/1992 | Off et al. . |
| 5,177,342 | 1/1993 | Adams . |
| 5,192,854 | 3/1993 | Counts . |
| 5,201,010 | 4/1993 | Deaton et al. . |
| 5,216,595 | 6/1993 | Protheroe . |
| 5,223,698 | 6/1993 | Kapur . |
| 5,231,569 | 7/1993 | Myatt et al. . |
| 5,239,165 | 8/1993 | Novak . |
| 5,243,515 | 9/1993 | Lee . |
| 5,245,533 | 9/1993 | Marshall . |
| 5,262,941 | 11/1993 | Saladin et al. . |
| 5,274,547 | 12/1993 | Zoffel et al. . |
| 5,283,731 | 2/1994 | Lalonde et al. . |
| 5,287,268 | 2/1994 | McCarthy . |
| 5,297,031 | 3/1994 | Gutterman et al. . |
| 5,302,811 | 4/1994 | Fukatsu . |
| 5,309,355 | 5/1994 | Lockwood . |
| 5,353,218 | 10/1994 | DeLapa et al. . |
| 5,353,219 | 10/1994 | Mueller et al. . |
| 5,380,991 | 1/1995 | Valencia et al. . |
| 5,420,606 | 5/1995 | Begum et al. . |
| 5,459,306 | 10/1995 | Stein et al. . |
| 5,481,094 | 1/1996 | Suda . |
| 5,504,475 | 4/1996 | Houdou et al. . |
| 5,510,979 | 4/1996 | Moderi et al. . |
| 5,572,653 | 11/1996 | DeTemple et al. . |
| 5,581,064 | 12/1996 | Riley et al. . |
| 5,592,375 | 1/1997 | Salmon et al. . |
| 5,592,376 | 1/1997 | Hodroff . |
| 5,602,377 | 2/1997 | Beller et al. . |
| 5,611,052 | 3/1997 | Dykstra et al. . |
| 5,612,868 | 3/1997 | Off et al. . |
| 5,615,269 | 3/1997 | Micali . |
| 5,620,079 | 4/1997 | Molbak . |
| 5,621,201 | 4/1997 | Langhans et al. . |
| 5,621,640 | 4/1997 | Burke . |
| 5,632,010 | 5/1997 | Briechle et al. . |
| 5,664,115 | 9/1997 | Fraser . |
| 5,665,953 | 9/1997 | Mazzamuto et al. . |
| 5,717,866 * | 2/1998 | Naftzger ................................ 705/14 |
| 5,724,886 | 3/1998 | Ewald et al. . |
| 5,822,735 * | 10/1998 | De Lapa et al. ....................... 705/14 |
| 6,055,513 * | 4/2000 | Katz et al. ............................. 705/26 |
| 6,064,987 * | 5/2000 | Wallier et al. ......................... 705/58 |
| 6,085,164 * | 7/2000 | Smith et al. ............................. 705/5 |

FOREIGN PATENT DOCUMENTS

| | | |
|---|---|---|
| WO 9735441 | 9/1997 | (WO) . |
| WO 97/46961 | 12/1997 | (WO) . |
| WO 97/50064 | 12/1997 | (WO) . |

OTHER PUBLICATIONS

Goodstein Ronald C, UPC Scanner pricingsystems pp. 1–6, Mar. 1997.*

"Cape Town", Reuters, Nov. 8, 1979, Thursday PM Cylce.

"Save The Mark", Financial Times (London), Feb. 1, 1983, Section I: Men & Matters at p. 12.

Greene, Jan, "Farm bills please assns; National Grocers Association", Supermarket News, Dec. 23, 1985, vol. 35, p. 6.

"POS spectrum: a lottery looks to POS for growth", POS News, Jan. 1989, vol. 5, No. 7, p. 8.

Kuttner, Robert, "Computers May Turn The World Into One Big Commodities Pit", Business Week, Sep. 11, 1989, Economic Viewpoint, No. 3123, p. 17.

Schrage, Michael, "An Experiment in Economic Theory; Labs Testing Real market", The Record, Nov. 26, 1989, Business, p. B01.

"Let's Play the Cash Register Receipts Lottery", The New York Times, Dec. 25, 1990, Section 1, p. 30, col. 4, Editorial Desk.

Del Rosso, Laura "Marketel says it plans to launch air fare 'auction' in June"; Marketel International Inc. Travel Weekly, Apr. 29, 1991; vol. 50; No. 34, p. 1; ISSN: 0041–2082.

"Phillips Offers Customers Financing Through Citicopr; Philips Medial Systems North America, Citicopr North America Inc.", Health Industry Today, Jun. 1991, vol. 54, No. 6, p. 4.

Pelline, Jeff, "Travelers Bidding on Airline Tickets SF Firm Offers Chance for Cut–rate Fares,", The San Franciso Chronicle, Aug. 19, 1991, p. A4.

Del Rosso, Laura, "Ticket–bidding Firm Closes Its Doors; Marketel International; Brief Article", Travel Weekly, Mar. 12, 1992, vol. 51, No. 21, p. 1, ISSN: 0041–2082.

"Winn–Dixie/The Salvation Army Report Contribution For War Against Hunger", PR Newswire, Jun. 10, 1993, Financial News Section.

Jones, Jeanne, "Data Readers Streamline Management; Scanner Technology Aids Retailers As Well As Plants, Wholesalers", The Houston Post, Jun. 26, 1994, Business Section, p. D1.

Fiorini, Philip, ""No Place for Penney?" Smallest Coin Doesn't Make Cents to Some", USA Today, Jul. 29, 1994, p. 1A.

Smith, Alison, "Survey of UK Consumer Credit and Asset Finance", Financial Times, Nov. 3, 1994, p. VI.

Andreoli et al., "Cash Machines Offer A Whole Lotto Money For Withdrawal . . . ," Crain's Chicago Business, Jun. 19, 1995, Section: News; p. 8.

"Spain: BBV Launches New Card", Cards International, Jun. 22, 1995, p. 5.

Knippenberg, Jim, "Psst! Will Local Radio Empires Strike Back?" The Cincinnati Enquirer, Section: Tempo; Jul. 23, 1995, p. F01.

Hadley, Kimberly, "Pastors Praying Anti–arson Effort Will Burn Bias", The Nashville Banner, Jul. 26, 1996, p. A13.

Gapper, John, "NatWest Reports Rise in Bad Debt", Financial Times Jul. 31, 1996, London Edition 3, News: UK Section, p. 09.

"Lynx Technology: Lynx to Provide Business Leasing Progamme Through Schroder Leasing", M2 Presswire, Aug. 9, 1996.

Taylor, Paul, "Towards A Dream Market", Financial Times, (London), Sep. 4, 1996, Section: Survey—FT IT; p. 03.

"Cyber Bid" Net Fund Ltd., Copyright 1996, Brochure.

Rehayem, Gilbert, "Opinion: X–press Betting", La Fleur's Lottery World, Feb. 7, 1997 at p. 4.

Singletary, Michelle, "Electronic World, Unchecked Problem? U.S. Move to Paperless Payments Raises Worries About Those Who Don't Use Banks", The Washington Post, Mar. 4, 1997, Final Edition, Financial Section, p. C01.

Kelsy, John; Schneier, Bruce, "Conditional Purchase Orders", Fourth ACM Conference on Computer Communication Security, Apr. 1997, ACM Press, pp. 117–124.

"AVCO Financial Services", National Home Furnishing Association, (http://www.homefurnish.com/NHFA/avco.htm), download date: May 23, 1997.

"Products and Services: Checkout Direct", Catalina Marketing Corporation, (http://catalinamktg.com/proddir.htm), download date: May 29, 1997.

Riordan, Teresa, "Patents; A novel approach to making a better spermicide harks back to some old–fashioned methods", The New York Times, Jun. 9, 1997; Section D; p. 2; col. 1; Business/Financial Desk.

Nairn, Geoff, "The key to your identity: Falling costs will allow fingerprint verification to be widely used", Financial Times (London) Jul. 15, 1997; Section: Technology; p. 12.

"The United Computer Exhange, How It All Works", The United Computer Exhange Corporation, (http://www.uce-.com/howitworks.htm), download date: Jul. 23, 1997.

"Classifieds2000: The Internet Classifieds", Classifieds2000, Inc. (http://www.classifieds2000.com/cgi–cls/Display.exe?C2K+aboutus), download date: Aug. 6, 1997.

"General Trading Floor Information and Terms Provided by tradingfloor.com", (http://www.tradingfloor.com/info.htm), download date: Aug. 14, 1997.

"NASDAQ—Information Sheet", (http://home.axford.com/corfin/corf11.htm), download date: Aug. 15, 1997.

Prochaska–Cue, Kathy, "Acquiring Credit", (http://ianrwww.unledu/IAN/PUBS/NEBFACTS/NF91–2.HTM), download date: Sep. 3, 1997.

"About IAO", Interactive Auction Online, (http://www/iaoauction.com/about.htm), download date: Sep. 8, 1997.

Livingston, Kimball, "In–Store Systems—VideOcard Redux", RT Magazine, Mar. 1998, pp. 29–30.

Welcome to ONSALE: Auction Supersite,: ONSALE, (http://www.iaoaction.com/about.htm), download date: Oct. 15, 1998.

Louise Cook, "Consumer Watch: Clip, Snip, Save", The Associated Press, Mar. 12, 1984, Monday PM Cycle.

"Coupons Get Serious; Supermarkets Use Barcodes to Prevent Misredemptions", Chain Store Age Executive with Shopping Center Age, Oct., 1992, vol. 68; No. 10; at p. 68; ISSN: 0193–1199.

Joseph Bonnici, David P. Campbell, William B. Fredenberger, Kathryn H. Hunnicutt; "Consumer Issues in Coupon Usage; An Exploratory Analysis", Journal of Applied Business Research, Winter 1996/1997, vol. 13, No. 1 at pp. 31–40; ISSN: 0892–7626.

Jim Kirk, "Digital Promotions Make Quick Point—McDonald's Testing New Technology on its Menus", Chicago Tribune, Dec. 26, 1997 at pp. 1–2.

"Progressive Introduces Kitchen Display System (KDS) for Restaurants", PR Newswire, Jan. 23, 1998, Financial News Section.

Adam Blair, "JICC Coupon Guide Recommends Upgrades at Front End", Supermarket News, Feb. 9, 1998, at p. 23; ISSN: 0039–5803.

"From Our Family To Yours . . . 5 Weeks of Coupon Values for a Variable Customer", Wakefern Food Corporation, Feb. 1998.

"U.P.C. Coupon Code Guidelines Manual—Section . . . ", Uniform Code Council, Inc., (http://www.uc–council.org/d31–3.htm), download date: Mar. 12, 1998.

"Advanced Mechanics Internet Specials", Advanced Mechanics, (http://www.metroplexweb.com/advcpn2.htm), download date: Mar. 12, 1998.

Mark Hamstra, "'Made–for–you' maneuvers signal competitive shift in QSR category", Nations Restaurant News, Apr. 13, 1998, 3 pgs.

"New Wave Marketing", Promotion Times an SCA Quarterly Newsletter, Apr. 1998.

Universal Holding Cabinet Rollout Program Brochure, H&K Dallas Inc., Winter 1998.

NCR 7453 PC–Based Point–of–Sale Solution Brochure, NCR, Winter 1998.

"POSitive Input; The McDonald's POS–3 System Newsletter from Olivetti Solutions", McDonald's, Spring/Summer Edition 1998, 8 pgs.

"It's In The Bag. Introducing the Universal Holding Cabinet From Welbilt", Frymaster, 1998 brochure.

"Introducing the Digital MenuBoard", Siren Technologies, brochure.

"For the Crew & the Customer—The Best Drive–Thru & Grill Service", Olivetti, brochure.

* cited by examiner

FIG. 4

| OFFER IDENTIFIER 70 | OFFER DESCRIPTION 72 | COST OF OFFER 74 | OFFER FREQUENCY 76 |
|---|---|---|---|
| A | LOTTERY TICKET | $1.00 | 25% |
| B | COUPON | $0.42 | 25% |
| C | UNSOLD MAGAZINE | $0.52 | 25% |
| D | FREE MEAL | $0.87 | 25% |

POS TERMINAL #7 _90_

| TRANSACTION IDENTIFIER 100 | DATE 102 | TIME 104 | PURCHASE DESCRIPTION 106 | OFFER IDENTIFIER 108 | OFFER ACCEPTED 110 | REVENUE FROM OFFER 112 |
|---|---|---|---|---|---|---|
| 12345670 | 1/30 | 8:00 AM | ITEMS X, Y, Z | A | NO | -- |
| 12345671 | 1/31 | 12:45 PM | ITEMS A, B, C, D | C | YES | $0.78 |
| 12345672 | 1/31 | 3:00 PM | ITEMS C, D BY CUSTOMER 7203 | B | YES | $0.50 |

| OFFER IDENTIFIER 150 | NUMBER OF TIMES ACCEPTED 152 | NUMBER OF TIMES PROVIDED 154 | ACCEPTANCE RATE 156 |
|---|---|---|---|
| A | 204 | 1,000 | 20.4% |
| B | 49 | 330 | 14.8% |
| C | 17 | 392 | 4.3% |
| D | 76 | 900 | 8.4% |

FIG. 7

| OFFER IDENTIFIER 180 | NUMBER OF TIMES ACCEPTED 182 | NUMBER OF TIMES PROVIDED 184 | AVERAGE REVENUE PER ACCEPTED OFFER 186 | AVERAGE PROFIT PER ACCEPTED OFFER 188 | AVERAGE PROFIT PER OFFER 190 |
|---|---|---|---|---|---|
| A | 204 | 1,000 | $1.50 | $0.50 | $0.102 |
| B | 49 | 330 | $0.78 | $0.36 | $0.053 |
| C | 17 | 392 | $1.00 | $0.48 | $0.021 |
| D | 76 | 900 | $0.95 | $0.08 | $0.007 |

| OFFER IDENTIFIER 310 | OFFER DESCRIPTION 312 | COST OF OFFER 314 | OFFER FREQUENCY 316 | FREQUENCY FIXED 318 |
|---|---|---|---|---|
| A | LOTTERY TICKET | $1.00 | 33% | NO |
| B | COUPON | $0.42 | 33% | NO |
| C | UNSOLD MAGAZINE | $0.52 | 33% | NO |
| D | $50.00 GIFT CERTIFICATE | $50.00 | 1% | YES |

METHOD AND APPARATUS FOR CONTROLLING OFFERS THAT ARE PROVIDED AT A POINT-OF-SALE TERMINAL

The present application is a continuation-in-part application of co-pending patent application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997, which is a continuation-in-part of co-pending patent application Ser. No. 08/822,709, entitled SYSTEM AND METHOD FOR PERFORMING LOTTERY TICKET TRANSACTIONS UTILIZING POINT-OF-SALE TERMINALS, filed on Mar. 21, 1997, each of which are incorporated herein by reference.

CROSS REFERENCE TO CO-PENDING APPLICATIONS

The present invention is related to the following United States Patent Applications filed contemporaneously herewith:

U.S. patent application Ser. No. 09/045,036, entitled METHOD AND APPARATUS FOR FACILITATING THE PLAY OF FRACTIONAL LOTTERY TICKETS UTILIZING POINT-OF-SALE TERMINALS, U.S. patent application Ser. No. 09/045,518, entitled METHOD AND APPARATUS FOR PROCESSING A SUPPLEMENTARY PRODUCT AT A POINT-OF-SALE TERMINAL, U.S. patent application Ser. No. 09/045,386, entitled METHOD AND APPARATUS FOR CONTROLLING THE PERFORMANCE OF A SUPPLEMENTARY PROCESS AT A POINT-OF-SALE TERMINAL, and U.S. patent application Ser. No. 09/045,347, entitled METHOD AND APPARATUS FOR PROCESSING A SUPPLEMENTARY PRODUCT SALE AT A POINT-OF-SALE TERMINAL, each assigned to the assignee of the present invention and incorporated by reference herein.

FIELD OF THE INVENTION

The present invention relates to point-of-sale terminals, and, more specifically, to methods and apparatus for controlling offers that are provided at point-of-sale terminals.

BACKGROUND OF THE INVENTION

Point-of-sale ("POS") terminals, such as cash registers, are used in a wide variety of businesses for performing such processes as calculating the total price of a purchase (goods or services) and calculating the amount of change due to a customer. In addition, POS terminals may also be used with an offering system in order to provide offers to customers. Such offering systems may be intended to increase sales, and thereby increase the average profit gained per transaction.

One type of offering system is described in the parent application of the present application, patent application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997. As described therein, a customer at a POS terminal is offered an "upsell" in exchange for an amount of change he is due. The POS terminal determines an upsell in dependence on a purchase of the customer, and also determines an upsell price (the amount of change due) based on the purchase. For example, a customer purchasing a first product for $1.74 and tendering $2.00 may be offered a second product in lieu of the $0.26 change due. The upsell price, $0.26, thus depends on the purchase price $1.74. Another type of offering system is a computer-determined "suggestive sell". U.S. Pat. No. 5,353,219 describes a system for suggesting items for a customer to purchase at conventional item prices.

In an offering system, there are many possible offers which may be provided to customers. For example, in the above-described upsell offer, many different upsells may be offered to a customer in exchange for the particular amount of change due. An offer to a customer at a fast-food restaurant may include a soda, large French fries, or a dessert. Precisely which upsell to offer may be chosen according to a predetermined program at random, or manually by a manager or other operator.

Unfortunately, random or manual selection of an offer does not necessarily assure that the "best" (highest performing) offers will be provided to customers. What constitutes the "best" offer may be evaluated with respect to one or more criteria, yielding corresponding "performance rates" for the various offers. For example, the acceptance rate of an offer is a performance rate that may be used to evaluate the offer, since some offers may be less likely to be accepted by customers than other offers. In addition, the profit derived from an accepted offer is another performance rate that may be used to evaluate the offer.

It may be difficult or impossible for a manager or other operator to identify the "best" offers (the offers with the highest performance rates). A manager is unlikely to have knowledge of the true performance rates of a group of offers. A manager is also unlikely to have the time to analyze historical trends to identify the best offers. In addition, at different times of the day or days of the week, certain offers may be more attractive to customers than others. Unanticipated events, such as a high state lottery jackpot or a good article in a magazine, may also make certain offers more attractive. Such circumstances impede attempts by a manager to identify the best offers. Accordingly, a need exists for controlling offers that are provided at a point-of-sale terminal.

SUMMARY OF THE INVENTION

It is an object of the present invention to control offers that are provided at a point-of-sale terminal.

In accordance with the present invention, a POS terminal or other computing device provides a plurality of offers to customers, and then measures a performance rate of each offer. For example, the acceptance rate or the profit rate of the offers may be measured. Based on the performance rates, a subset of offers is selected. In one embodiment, the highest performing offers are selected. In another embodiment, those offers having performance rates above a predetermined threshold are selected. The selected subset of offers is then provided, while the remaining, less desirable offers are discontinued.

BRIEF DESCRIPTION OF THE DRAWINGS

FIG. 4 is a table illustrating an embodiment of a database of offers.

FIG. 5 is a schematic illustration of a record of a transaction database.

FIG. 7 is a table illustrating an embodiment of a performance rate database.

FIG. 8 is a table illustrating another embodiment of a performance rate database.

FIG. 11 is a table illustrating another embodiment of a database of offers.

DETAILED DESCRIPTION OF THE PREFERRED EMBODIMENTS

One or more POS terminals control offers that are provided to customers, such that those offers which have high performance rates are provided. The present invention determines the best offers by providing customers with a group of offers, and evaluating the performance rates of the offers. By contrast, random or manual (human) selection of offers is unlikely to determine the best offers. Furthermore, the present invention advantageously relieves managers or other personnel of the task of selecting offers.

By continually evaluating the performance rates of offers, the offers provided to customers continue to be the highest performing. If the performance rate of a once-attractive offer decreases, it can be replaced by other, higher-performing offers.

The present invention may further make the offer appear to the customer to be random, since a POS terminal typically provides different offers at different times. This, in turn, can make it difficult for customers to manipulate the offer system to their advantage.

Figure 1:
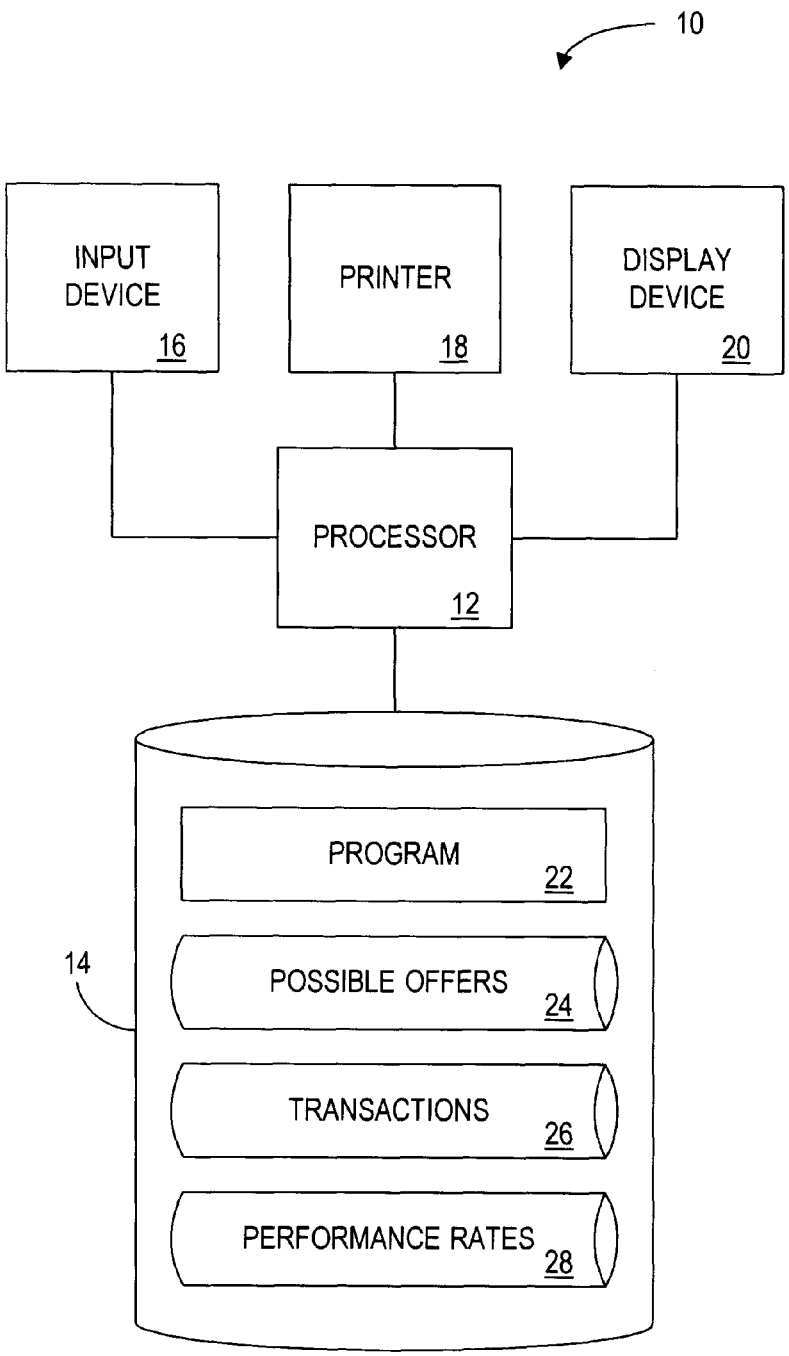
FIG. 1 is a schematic illustration of a POS terminal provided in accordance with the present invention.

Referring to FIG. 1, a POS terminal 10, which may be the IBM 4683 or IBM 4693 manufactured by International Business Machines, comprises a processor 12, such as one or more conventional microprocessors. The processor 12 is in communication with a data storage device 14, such as an appropriate combination of magnetic, optical and/or semiconductor memory. The processor 12 and the storage device 14 may each be (i) located entirely within a single computer or other computing device; (ii) connected to each other by a remote communication medium, such as a serial port cable, telephone line or radio frequency transceiver; or (iii) a combination thereof. For example, the POS terminal 10 may comprise one or more computers which are connected to a remote server computer for maintaining databases.

An input device 16 preferably comprises a keypad for transmitting input signals, such as signals indicative of a purchase, to the processor 12. A printer 18 is for registering indicia on paper or other material, thereby printing receipts, coupons and vouchers as commanded by the processor 12. A display device 20 is preferably a video monitor for displaying at least alphanumeric characters to the customer and/or cashier. Many types of input devices, printers and display devices are known to those skilled in the art, and need not be described in detail herein. The input device 16, printer 18 and display device 20 are each in communication with the processor 12.

The storage device 14 stores a program 22 for controlling the processor 12. The processor 12 performs instructions of the program 22, and thereby operates in accordance with the present invention, and particularly in accordance with the methods described in detail herein. The program 22 furthermore includes program elements that may be necessary, such as an operating system and "device drivers" for allowing the processor 12 to interface with computer peripheral devices, such as the input device 16, the printer 18 and the display device 20.

Appropriate device drivers and other necessary program elements are known to those skilled in the art, and need not be described in detail herein.

The storage device 14 also stores (i) a database of offers 24; (ii) a transaction database 26; and (iii) a performance rate database 28. The databases 24, 26 and 28 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Figure 2:
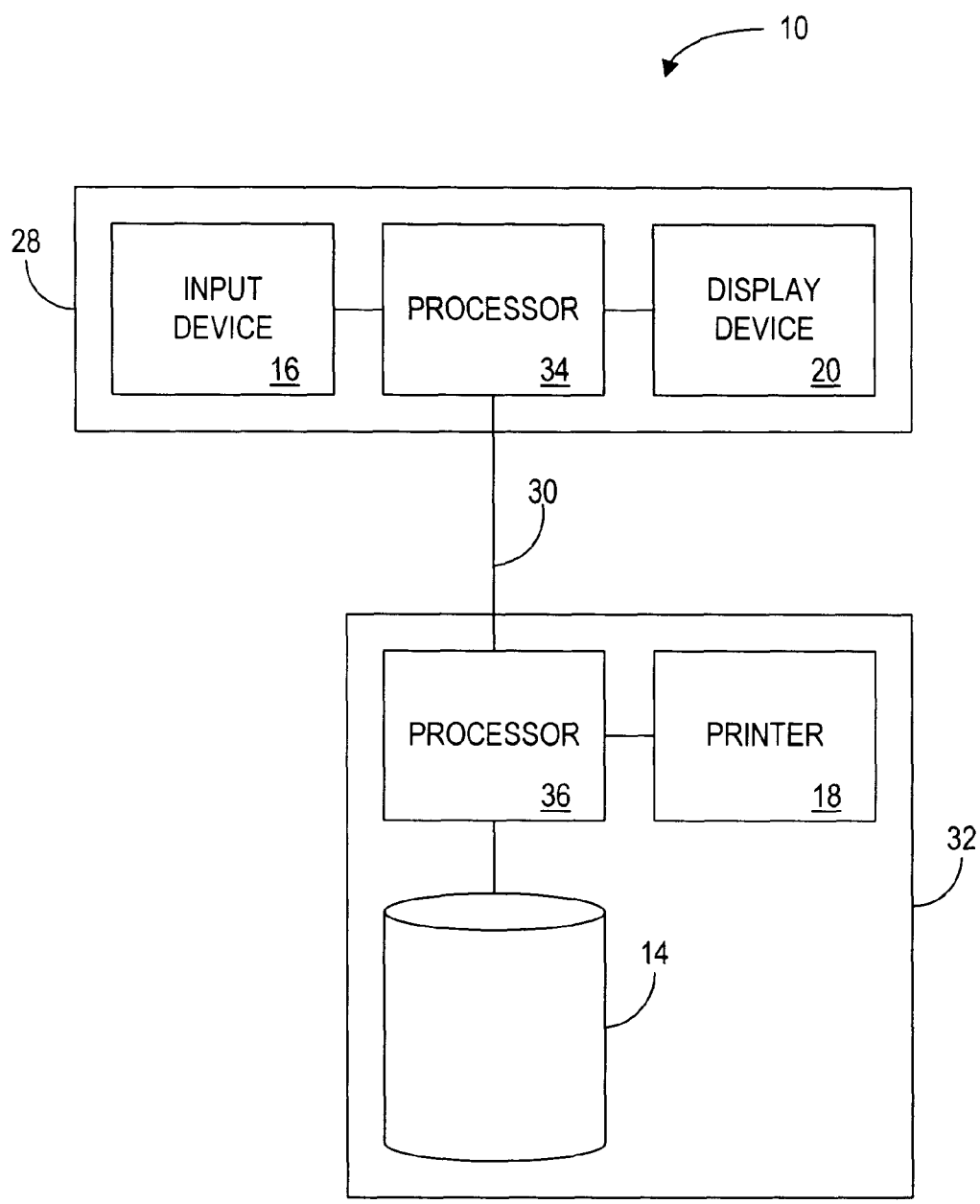
FIG. 2 is a schematic illustration of another embodiment of the POS terminal of FIG. 1.

FIG. 2 illustrates another embodiment of the POS terminal 10, in which a control device 28 is in communication via a communication medium 30 with a system 32 for providing an offer. The control device 28 comprises a processor 34 in communication with the input device 16 and the display device 20. The system 32 for providing an offer comprises a processor 36 in communication with the storage device 14 and the printer 18. In this embodiment, the control device 28 may be a cash register, and the system 32 may be an electronic device for printing coupons in accordance with data received from the cash register. Other configurations of the POS terminal 10 will be understood by those skilled in the art.

Figure 3:
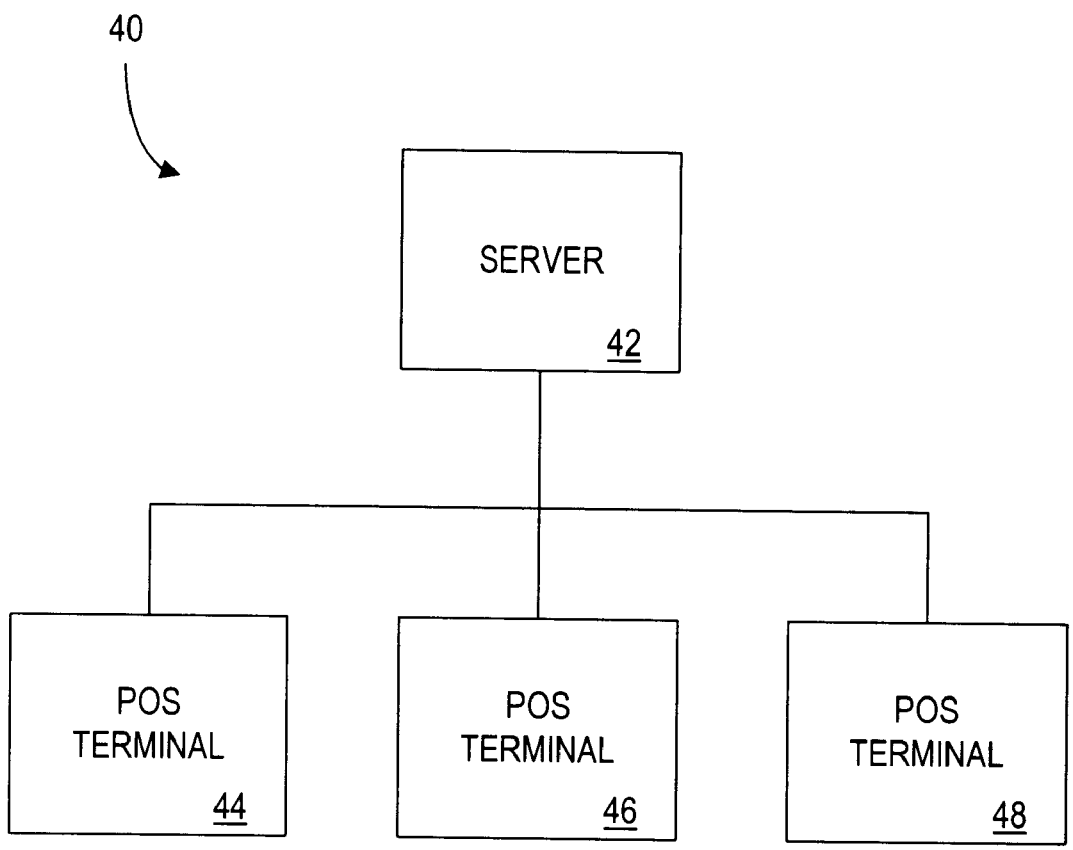
FIG. 3 is a schematic illustration of a network of POS terminals.

Referring to FIG. 3, a network 40 includes a server 42 in communication with POS terminals 44, 46 and 48. The server 42 directs the operation of, stores data from, and transmits data to the POS terminals 44, 46 and 48. The server 42 may itself be a POS terminal, as described above, or may be another computing device which can communicate with one or more POS terminals. Although three POS terminals are shown in FIG. 3, any number of POS terminals may be in communication with the server 42 without departing from the spirit and scope of the present invention. Each of the POS terminals 44, 46 and 48 may be located in the same store, in different stores of a chain of stores, or in other locations. The server 42 may perform many of the processes described below, especially those processes that are performed for more than one POS terminal. The server 42 may furthermore store data such as the database of offers 24.

Referring to FIG. 4, a table 60 illustrates an embodiment of the database of offers 24 (FIG. 1). The table 60 includes entries 62, 64, 66 and 68, each of which describes an offer to be provided to customers. It will be understood by those skilled in the art that the table 60 may include any number of entries. Each of the entries 62, 64, 66 and 68 specifies (i) an offer identifier 70 for uniquely indicating the offer; (ii) an offer description 72 for describing the offer; (iii) a cost of the offer 74 to the offeror; and (iv) an offer frequency 76. The offer frequency 76 indicates the average percentage of times that the corresponding offer is to be provided when an offer is provided. For example, each of the entries 62, 64, 66 and 68 includes an offer frequency of 25%, and thus each of the entries 62, 64, 66 and 68 will be provided to customers approximately one out of every four times an offer is provided, on average.

Referring to FIG. 5, a record 90 of the transaction database 26 (FIG. 1) defines the transactions performed at a POS terminal identified by a POS terminal identifier 92. The transaction database 26 (FIG. 1) typically includes a plurality of records such as the record 90, each defining the transactions performed at a different POS terminal. The record 90 includes entries 94, 96 and 98 which each describe a transaction. It will be understood by those skilled in the art that the record 90 may include any number of entries. Each of the entries 94, 96 and 98 specifies (i) a transaction identifier 100 that uniquely indicates a transaction; (ii) a date 102 of the transaction; (iii) a time 104 of the transaction; (iv) a purchase description 106 that describes details of the transaction, such as the items purchased, the purchase price and/or the identity of the customer; (v) an offer identifier 108 that indicates an offer that was provided during the transaction; (vi) an indication of whether the offer was accepted 110; and (vii) a revenue 112 that is derived due to the customer accepting the offer.

Figure 6:
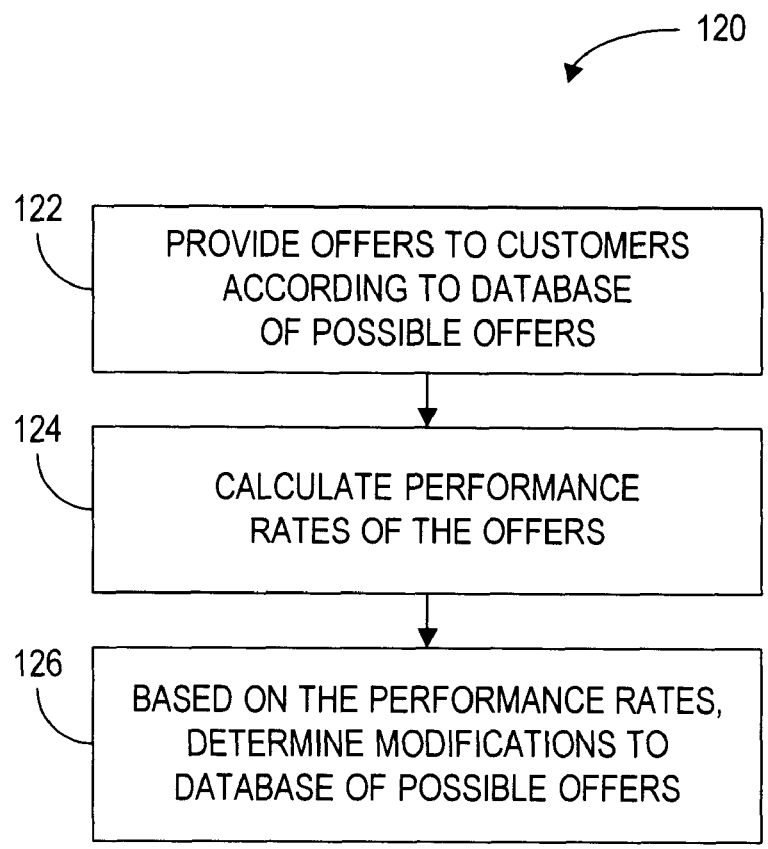
FIG. 6 is a flow chart illustrating a method for controlling offers that are provided at one or more POS terminals.

Referring to FIG. 6, a flow chart 120 illustrates a method for controlling offers that are provided at one or more POS terminals. Offers are provided to customers (step 122) in accordance to the database of offers 24 (FIG. 1). As described above with reference to the table 60 (FIG. 4), each offer includes an offer frequency that indicates the average percentage of times that the corresponding offer is to be provided. Thus, the database of offers 24 indicates which offers are to be provided to customers, and also indicates the frequency with which the offers are to be provided.

For example, the POS terminal 10 (FIG. 1) (or the server 42 of FIG. 3, in a networked embodiment) may generate a random number between 0 and 1 each time an offer is to be provided. Then, an offer would be selected in accordance with the random number and with the offer frequency illustrated in FIG. 4. A random number between 0.00 and 0.25 would correspond to the offer "A", while a random number between 0.26 and 0.50 would correspond to the offer "B", and so on for offers "C" and "D".

Alternatively, the POS terminal 10 or server 42 can provide a first offer during a first series of transactions, and then provide subsequent offers during consecutive series of transactions. The sizes of the series of transactions (the number of transactions in the series) would be selected in accordance with the offer frequencies 76 of the table 60 (FIG. 4). For example, each of the offers specified by the table 60 of FIG. 4 has an equal offer frequency (25%). Thus, the first offer "A" defined by the entry 62 could be provided to customers during a first series of ten transactions, and the remaining three offers defined by the entries 64, 66 and 68 could be provided during subsequent series of ten transactions each. Since there are four offers and each offer is provided to customers during ten out of forty transactions, each offer has a frequency of 25%.

In another embodiment, each of a plurality of POS terminals may provide a different offer to customers. For example, a first POS terminal could provide a first offer during a series of one hundred transactions, and a second POS terminal could provide a second offer during a series of one hundred transactions. Accordingly, both the first offer and the second offer would have a frequency of 50% (100/(100+100)=0.50=50%).

Once offers are provided to customers at step 122, the POS terminal 10 or server 42 calculates the performance rate of each offer (step 124). The performance rate may be any measured and/or calculated quantity, such as an Acceptance Rate or a Profit Rate. Many other performance rates will be understood by those skilled in the art. The performance rate of each offer may be calculated at predetermined periods, such as at the end of each day, or after predetermined numbers of offers have been provided to customers.

An Acceptance Rate may be calculated in accordance with the following:

$$\text{Acceptance Rate} = \text{Number of Times Accepted}/\text{Number of Times Provided}$$

The Number of Times Provided is the number of times a particular offer was provided to customers. Similarly, the Number of Times Accepted is the number of times that the provided offer was accepted by customers. Both the Number of Times Provided and the Number of Times Accepted may be determined from data stored in the transaction database 26 (FIG. 1). It is typically desirable to have a high Acceptance Rate, and ideally an offer will have an Acceptance Rate of 100%. However, it is likely that the Acceptance Rate of an offer will be less than 100%.

Referring to FIG. 7, a table 140 illustrates an embodiment of the performance rate database 28 (FIG. 1). In this embodiment, the performance rate database 28 is configured to store Acceptance Rate data as described above. The table 140 includes entries 142, 144, 146 and 148, each of which describes an offer that has been provided to customers. It will be understood by those skilled in the art that the table 140 may include any number of entries. Each of the entries 142, 144, 146 and 148 specifies (i) an offer identifier 150 for uniquely indicating the offer; (ii) a number of times accepted 152; (iii) a number of times provided 154; and (iv) an acceptance rate 156 of the offer. The table 140 may thus be used in determining which offers have the highest performance rate.

A Profit Rate is a performance rate of an offer that may be calculated in accordance with the following:

$$\text{Profit Rate} = (\text{Revenue} - \text{Cost})/\text{Number of Times Provided}$$

The Revenue is the amount of all income derived due to customers accepting the offer. The Cost is the expense incurred from customers accepting the offer. The Number of Times Provided is the number of times a particular offer was provided to customers.

Referring to FIG. 8, a table 170 illustrates another embodiment of the performance rate database 28 (FIG. 1). In this embodiment, the performance rate database 28 is configured to store average profit per offer. The table 170 includes entries 172, 174, 176 and 178, each of which describes an offer that has been provided to customers. It will be understood by those skilled in the art that the table 170 may include any number of entries. Each of the entries 172, 174, 176 and 178 specifies (i) an offer identifier 180 for uniquely indicating the offer; (ii) a number of times accepted 182; (iii) a number of times provided 184; (iv) an average revenue derived per accepted offer 186; (v) an average profit derived per accepted offer 188; and (vi) an average profit derived per offer 190.

Those skilled in the art will understand that the number of times accepted 182, the number of times provided 184 and the average revenue 186 may be determined from data stored in the transaction database 26 (FIG. 1). For example, referring again to the record 90 of FIG. 5, at the POS terminal #7 the offers "A", "B" and "C" have each been offered once, as seen from the offer identifier 108. The offers "B" and "C" have each been accepted once, as indicated by the offer accepted 110 field. Similarly, the revenue derived for the offers "A", "B" and "C" is $0.00, $0.50 and $0.78 respectively. An average revenue for each offer would be derived by dividing the total revenue from each offer by the number of times it was offered.

The average profit per accepted offer 188 may be determined by subtracting the cost per offer (the cost 74 of FIG. 4) from the average revenue 186. Finally, the average profit per offer 190, which is the profit rate defined above, may be determined by multiplying the average profit per accepted offer 188 by the acceptance rate of the offer. As described above, the acceptance rate of the offer is determined by dividing the number of times accepted 182 by the number of times provided 184.

Referring again to FIG. 6, after the performance rates of the offers have been calculated (step 124), the POS terminal 10 or server 42 determines modifications to the database of offers 24 based on the performance rates (step 126). Each offer may be provided at a different offer frequency, or even discontinued, in accordance with the calculated performance rate of that offer. As described below, offers with higher performance rates continue to be provided to customers, and are typically provided at higher offer frequencies. Similarly, offers with low performance rates are typically provided at lower offer frequencies, or may even cease to be provided altogether.

In one embodiment, only offers having performance rates greater than a predetermined threshold continue to be provided to customers. If one or more offers cease to be provided, each offer frequency must be changed, as described below.

Figure 9:
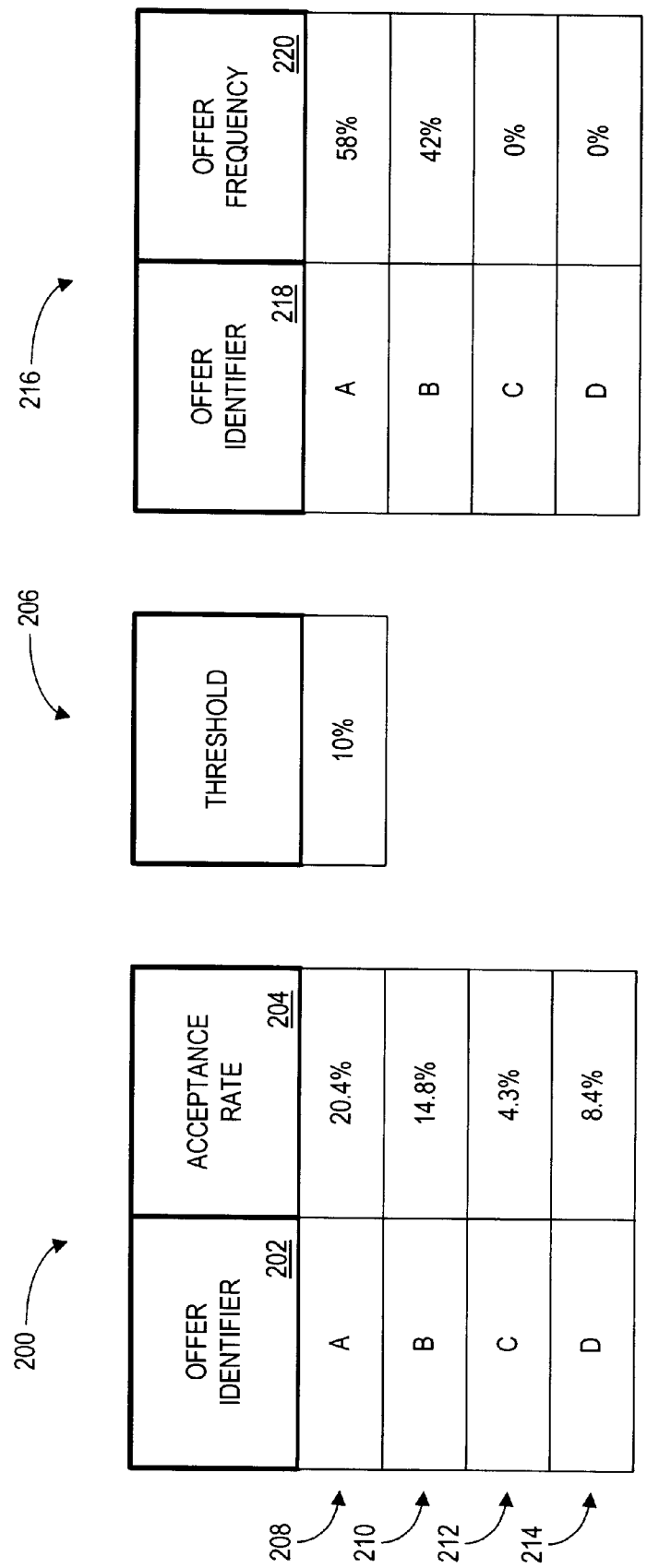
FIG. 9 is a schematic illustration of databases employed in determining offers which continue to be provided.

FIG. 9 illustrates the selection of offers to discontinue. A table 200 depicts data stored in an embodiment of the performance rate database 28 (FIG. 1). For each offer, there is an offer identifier 202 and an acceptance rate 204. A threshold 206 of 10% defines which of the offers in the table 200 will continue to be provided. In particular, the offers defined by entries 208 and 210 (the offers "A" and "B") have acceptance rates greater than 10%, and thus will continue to be provided. By contrast, the offers defined by entries 212 and 214 (the offers "C" and "D") have acceptance rates less than 10%, and thus will be discontinued.

A table 216 depicts data stored in an embodiment of the database of offers 24 (FIG. 1). As described above with respect to FIG. 4, each offer has an offer identifier 218 and an offer frequency 220. Since the offers "C" and "D" have been discontinued, the corresponding offer frequencies of those offers are 0%. The offer frequencies of the offers "A" and "B", which continue to be offered, change accordingly. The offer frequencies may be changed so that they are equal to each other (50% each). Alternatively, the offer frequencies may be changed in accordance with their relation to one another, as follows:

$$F_{new} = F_{old}/F_{total}$$

Where:

$F_{new}$ is the new offer frequency $F_{old}$ is the offer frequency prior to being changed $F_{total}$ is the sum of the values of $F_{old}$ for the offers that are not discontinued In FIG. 9, the offer frequency "58%" of the offer "A" is calculated by from the offer frequencies of the offers that are not discontinued:

$$58\% = 20.4\%/(20.4\% + 14.8\%)$$

The offer frequency "42%" of the offer "B" is similarly calculated:

$$42\% = 14.8\%/(20.4\% + 14.8\%)$$

Those skilled in the art will understand that there are other methods for changing the offer frequencies of offers.

Figure 10:
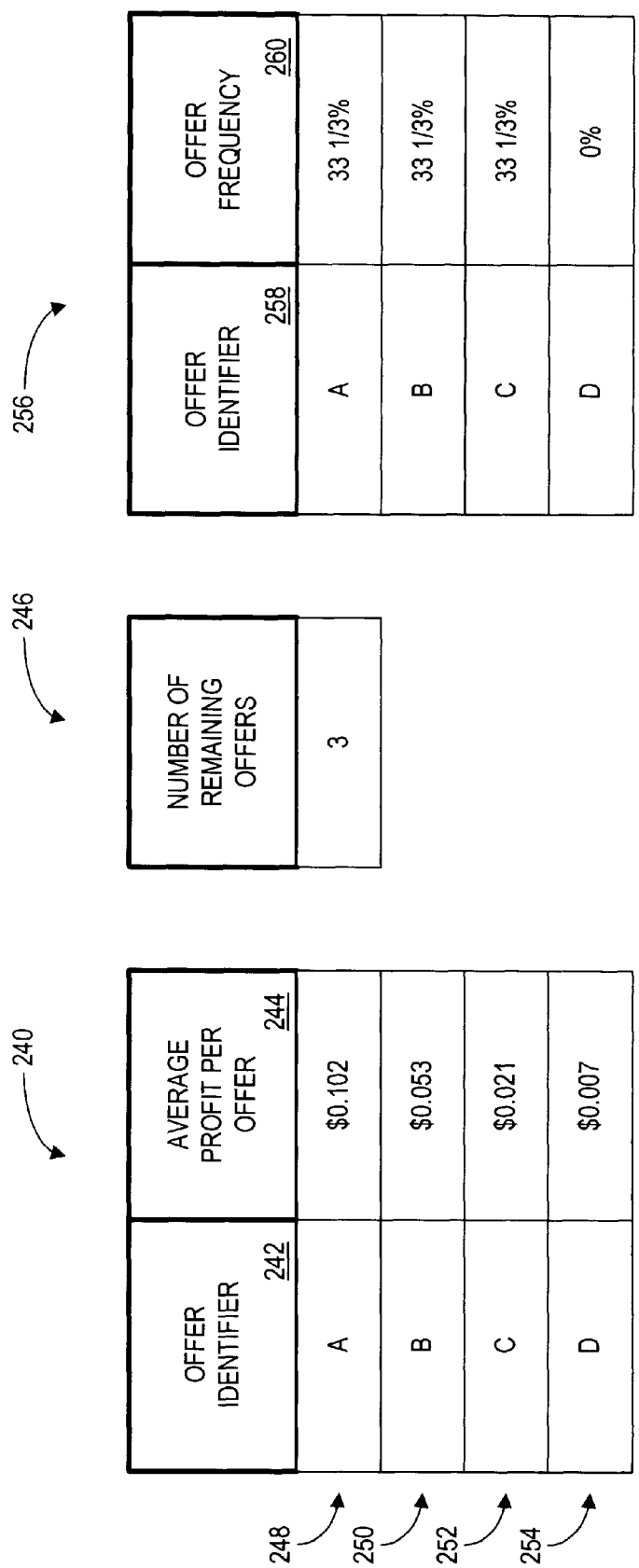
FIG. 10 is a schematic illustration of another embodiment of databases employed in determining offers which continue to be provided.

In another embodiment, a predetermined number of the highest-performing offers continue to be provided to customers. The remaining offers, if any, are not provided. FIG. 10 illustrates the selection of offers to discontinue in this embodiment. A table 240 depicts data stored in another embodiment of the performance rate database 28 (FIG. 1). For each offer, there is an offer identifier 242 and an average profit per order 244. A threshold 246 of "three" defines the number of highest-performing offers in the table 240 which will continue to be provided. In particular, the offers defined by entries 248, 250 and 252 (the offers "A", "B" and "C") are the top three offers with respect to average profit per order, and thus will continue to be provided. By contrast, the offer defined by entry 254 (the offer "D") will be discontinued.

A table 256 depicts data stored in an embodiment of the database of offers 24 (FIG. 1). As described above, each offer has an offer identifier 258 and an offer frequency 260. Since the offer "D" has been discontinued, the corresponding offer frequency is 0%. The offer frequencies of the offers "A", "B" and "C", which continue to be offered, change accordingly. The offer frequencies may be changed so that they are equal to each other (33⅓% each). Alternatively, the offer frequencies may be changed in accordance with their relation to one another, in the manner described above.

Once offers have been discontinued, it may be desirable to make them available again at some time in the future. For example, after an offer has been discontinued due to a poor performance rate, conditions such as consumer tastes may change. Accordingly, discontinued offers may continue to be maintained in the database of offers 24 (FIG. 1), and, after an offer has been discontinued for more than a predetermined amount of time, it may be advantageous to evaluate its performance rate once again. The discontinued offer may be granted a randomly-selected or predetermined offer frequency, allowing the corresponding performance rate to be evaluated.

In addition, in some situations, after offers are discontinued only one offer may continue to be offered. The performance rate of this offer is evaluated, and compared with the performance rate of the offer in prior time periods. If the performance rate declines below that of prior time periods, the offer may be discontinued and replaced. As a replacement, another (discontinued) offer may be granted a randomly-selected or predetermined offer frequency, allowing the corresponding performance rate to be evaluated.

In some embodiments it may be desirable that the offer frequency of certain offers be unchanged, regardless of the performance rate calculated for those offers. For example, a high-value offer could have a very low offer frequency. The offer could then act as a prize that few customers could receive. Accordingly, the cost of giving such a high-value offer in exchange for change due would be incurred rarely, yet could serve as advertising to prompt customers to frequent a business.

Referring to FIG. 11, a table 300, similar to the table 60 of FIG. 4, illustrates another embodiment of the database of offers 24 (FIG. 1). The table 300 includes entries 302, 304, 306 and 308, each of which describes an offer to be provided to customers. Each of the entries 302, 304, 306 and 308 specifies (i) an offer identifier 310 for uniquely indicating the offer; (ii) an offer description 312 for describing the offer; (iii) a cost of the offer 314 to the offeror; (iv) an offer frequency 316 and (v) a fixed frequency indication 318. The fixed frequency indication 318 indicates whether the corresponding offer frequency may be changed based on the performance rate of the offer, as described above. For example, the entry 308 includes an offer frequency of 1%. Since this offer has a relatively high value ($50 gift certificate), it is likely that it will be accepted often, perhaps always. However, the high cost ($50) of the offer can make it unprofitable to offer more frequently. Accordingly, the frequency of that offer is fixed at 1%.

Although the present invention has been described with respect to a preferred embodiment thereof, those skilled in the art will note that various substitutions may be made to those embodiments described herein without departing from the spirit and scope of the present invention. For example, the evaluation of offers may also account for the time of day at which the offers were provided.

What is claimed is:

1. A computer-implemented method for controlling offers that are provided at a point-of-sale terminal, comprising:
    providing a plurality of upsells at a point-of-sale terminal:
    measuring a performance rate of each upsell, thereby defining a plurality of performance rates;
    selecting a subset of upsells based on at least one of the plurality of performance rates; and
    providing the subset of upsells at a point-of-sale terminal.

2. The method of claim 1, in which the step of providing a plurality of upsells is performed during a first time period; and in which the step of providing the subset of upsells is performed during a second time period which is subsequent to the first time period.

3. The method of claim 1, in which the step of providing a plurality of upsells comprises:
    providing an upsell of the plurality of upsells at each of a plurality of terminals.

4. The method of claim 1, further comprising:
    measuring a performance rate of the subset; and
    if the performance rate of the subset is less than a predetermined threshold,
        providing the plurality of upsells after the step of providing the subset of upsells.

5. The method of claim 1, in which the step of selecting a subset of upsells comprises:
    selecting upsells that have at least a predetermined performance rate.

6. The method of claim 1, in which the step of selecting a subset of upsells comprises:
    selecting a predetermined number of highest-performing upsells.

7. An apparatus for controlling offers that are provided at a point-of-sale terminal, comprising:
    a storage device; and
    a processor connected to the storage device,
    the storage device storing a program for controlling the processor; and
    the processor operative with the program to:
        provide a plurality of upsells at a point-of-sale terminal;
        measure a performance rate of each upsell thereby defining a plurality of performance rates;
        select a subset of upsells based on at least one of the plurality of performance rates; and
        provide the subset of upsells at a point-of-sale terminal.

8. The apparatus of claim 7, in which the processor is further operative with the program to:
    provide a plurality of upsells during a first time period; and
    provide the subset of upsells during a second time period which is subsequent to the first time period.

9. The apparatus of claim 7, in which the processor is further operative with the program to provide an upsell of the plurality of upsells at each of a plurality of terminals.

10. The apparatus of claim 7, in which the processor is further operative with the program to:
    measure a performance rate of the subset; and
    if the performance rate of the subset is less than a predetermined threshold,
        provide the plurality of upsells after a provision of the subset of upsells.

11. The apparatus of claim 7, in which the processor is further operative with the program to select upsells that have at least a predetermined performance rate.

12. The apparatus of claim 7, in which the processor is further operative with the program to select a predetermined number of highest-performing upsells.

13. A computer-implemented method for controlling offers that are provided at a point-of-sale terminal, comprising:
    providing a first upsell at a point-of-sale terminal;
    measuring a performance rate of the first upsell; and
    if the performance rate of the first upsell is below a predetermined threshold,
        providing a second upsell at a point-of-sale terminal.

14. An apparatus for controlling offers that are provided at a point-of-sale terminal, comprising:
    a storage device; and
    a processor connected to the storage device,
    the storage device storing a program for controlling the processor; and
    the processor operative with the program to:
        provide a first upsell at a point-of-sale terminal;
        measure a performance rate of the first upsell; and
        if the performance rate of the first upsell is below a predetermined threshold,
            provide a second upsell at a point-of-sale terminal.

15. A computer-implemented method for controlling offers that are provided at a point-of-sale terminal, comprising:
    providing a first upsell at a first point-of-sale terminal;
    providing a second upsell at a second point-of-sale terminal;
    measuring a performance rate of the first upsell;
    measuring a performance rate of the second upsell; and
    if the performance rate of the second upsell is less than the performance rate of the first upsell,
        providing the first upsell at the second point-of-sale terminal.

16. An apparatus for controlling offers that are provided at a point-of-sale terminal, comprising:
    a storage device; and
    a processor connected to the storage device,
    the storage device storing a program for controlling the processor; and
    the processor operative with the program to:
        provide a first upsell at a first point-of-sale terminal;
        provide a second upsell at a second point-of-sale terminal;
        measure a performance rate of the first upsell;
        measure a performance rate of the second upsell; and
        if the performance rate of the second upsell is less than the performance rate of the first upsell,
            provide the first upsell at the second point-of-sale terminal.

17. A computer implemented method for controlling offers that are provided at a point-of-sale terminal, comprising:

for each of a plurality of purchases,
        determining an upsell in dependence on the purchase,
        determining an upsell price, each upsell price being based on a purchase, and
        offering to exchange the upsell price for the upsell;
    measuring a performance rate of each upsell, thereby defining a plurality of performance rates;
    selecting a subset of upsells based on at least one of the plurality of performance rates; and
    providing the subset of upsells at a point-of-sale terminal.

18. An apparatus for controlling offers that are provided at a point-of-sale terminal, comprising:

a storage device; and
    a processor connected to the storage device,
    the storage device storing a program for controlling the processor; and
    the processor operative with the program to, for each of a plurality of purchases:
        determine an upsell in dependence on the purchase,
        determine an upsell price, each upsell price being based on a purchase, and
        offer to exchange the upsell price for the upsell;
        measure a performance rate of each upsell, thereby defining a plurality of performance rates;
    select a subset of upsells based on at least one of the plurality of performance rates; and
    provide the subset of upsells at a point-of-sale terminal.

\* \* \* \* \*